US012653205B2

(12) United States Patent
Jain et al.

(10) Patent No.: US 12,653,205 B2
(45) Date of Patent: Jun. 16, 2026

(54) OXYGEN ABSORBER TABLET

(71) Applicant: Manish Jain, Pune (IN)

(72) Inventors: Manish Jain, Pune (IN); Vivek Kumar Jha, Pune (IN)

(73) Assignee: Manish Jain, Pune (IN)

( * ) Notice: Subject to any disclaimer, the term of this patent is extended or adjusted under 35 U.S.C. 154(b) by 313 days.

(21) Appl. No.: 18/566,648

(22) PCT Filed: Mar. 30, 2023

(86) PCT No.: PCT/IN2023/050309
§ 371 (c)(1),
(2) Date: Dec. 3, 2023

(87) PCT Pub. No.: WO2023/195019
PCT Pub. Date: Oct. 12, 2023

(65) Prior Publication Data
US 2024/0260617 A1 Aug. 8, 2024

(30) Foreign Application Priority Data

Apr. 7, 2022 (IN) .............................. 202221020921

(51) Int. Cl.
*A23B 2/717* (2025.01)
*B01J 20/02* (2006.01)
*B01J 20/28* (2006.01)
*B01J 20/30* (2006.01)

(52) U.S. Cl.
CPC ........... *A23B 2/717* (2025.01); *B01J 20/0229* (2013.01); *B01J 20/2803* (2013.01); *B01J 20/28047* (2013.01); *B01J 20/3021* (2013.01); *B01J 20/3035* (2013.01); *B01J 20/3042* (2013.01)

(58) Field of Classification Search
CPC ... A23B 2/717; B01J 20/0229; B01J 20/2803; B01J 20/28047; B01J 20/3021; B01J 20/3035; B01J 20/3042
See application file for complete search history.

(56) References Cited

U.S. PATENT DOCUMENTS

2010/0051861 A1 3/2010 Inubushi et al.
2022/0072503 A1* 3/2022 Sugimoto .......... G01N 27/9046

FOREIGN PATENT DOCUMENTS

CA 2040993 8/2001
KR 102307435 9/2021

* cited by examiner

*Primary Examiner* — Haidung D Nguyen
(74) *Attorney, Agent, or Firm* — Soroker Nordman Riba

(57) ABSTRACT

The present invention discloses an oxygen absorber composition in the form of an oxygen absorber tablet and a process for the preparation of the oxygen absorber tablet. The oxygen absorber tablet includes composition A and iron powder. Composition A has binding agent, carbon, silica gel, clay, hygroscopic salt and magnesium stearate. The ratio of iron powder to Composition A is determined depending on the target air volume from where the oxygen is to be removed. The tablets are prepared for 30 cc, 100 cc, 250 cc and 500 cc of target air volume. The tablet has an enhanced oxygen absorption amount per unit volume. It absorbs moisture and odour from the available target air volume and helps diminish the hydrogen and carbon dioxide gas generated during oxidation. The tablets are compact, user friendly and are useful to increase the shelf life of pharmaceutical, food and nutraceutical products.

9 Claims, 4 Drawing Sheets

OXYGEN ABSORBER TABLET

FIELD OF THE INVENTION

The present invention relates to an oxygen absorber composition and more particularly to an oxygen absorber tablet having enhanced oxygen absorption activity.

BACKGROUND OF THE INVENTION

Aerobic organisms are capable of surviving and growing in an environment of oxygen. These organisms require oxygen for respiration to derive energy for their metabolic activities. Therefore, in order to deter the growth of aerobic organisms, it is necessary to have an environment devoid of oxygen. A packaging environment that is free of oxygen is a prime necessity in food, drug and nutraceutical industry, in order to prolong the shelf life of these products. Further, oxygen is also responsible for the process of oxidation in these products that lead to off flavors and off odors to the products.

Rancidity and fungus formation in food and nutraceutical products are some of the examples of oxidative degradation experienced by the consumers. Oxidative degradation further includes loss of potency in pharmaceuticals, loss of function of sensitive diagnostic products due to oxidation, corrosion of electronics, and yellowing and embrittlement of archives and artifacts. Superior packaging options need to be developed to minimize oxidative degradation.

Various techniques have been used in the art to curtail the contact of oxygen with the food, drug, and nutraceutical products. One of the approaches includes processing under nitrogen and minimizing container headspace for prolonged stability of oxygen sensitive drugs. Another approach includes processing at low temperatures to augment the chemical stability. Polymeric film coatings have been used to diminish the rate of oxygen pervasion into the drugs. These approaches cannot be applicable to every type of product, require additional operational setup and further involve additional costs.

Another known approach is the use of oxygen absorbers. The typical oxygen absorbers known in the prior art depend upon oxidation of iron or similar metal to reduce oxygen. These absorbers are based on the mechanism requiring the presence of moisture in order to function. The U.S. Pat. No. 6,248,690B1 to Mckedy George E. describes an oxygen absorbing composition comprising particulate annealed electrolytically reduced iron, a salt, and a water-supplying component. The U.S. Pat. No. 6,315,921B1 to Delduca Gary R. and others describes an iron-based oxygen absorber packet that is activated by injection of water. The European patent application EP1243524A2 to Waterman Kenneth Craig discloses a kit having an iron-based oxygen absorber with added moisture controlled by salt slurries. The kit causes a relative humidity of 55 to 75% within the bottles and requires the use of separate desiccants to keep the contents dry, hence proving unsuitable for stabilization of pharmaceutically active ingredients over entire shelf life. Also, the currently available oxygen absorbers are mainly used in powdered form that induces the threat of dust or particle spillage from the pouches or canisters holding them.

There is a need of a readily acceptable solution to address the problems associated with the use, performance, and limitations of existing usage of oxygen absorbers. There is a need of a composition in the form of an oxygen absorber tablet having an enhanced oxygen absorption amount per unit volume.

SUMMARY OF THE INVENTION

The present invention describes an oxygen absorber tablet formed by compressing an oxygen absorber composition comprising 5 gm to 15 gm binding agent; 25 gm to 35 gm carbon; 25 gm to 35 gm silica gel; 35 gm to 45 gm clay; 10 gm to 15 gm hygroscopic salt; 1 gm to 5 gm magnesium stearate; iron powder; water; and an antimicrobial agent. The oxygen absorber tablet particularly includes 10 gm of binding agent; 30 gm of carbon; 30 gm of silica gel; 40 gm of clay; 12 gm of hygroscopic salt; 2 gm of magnesium stearate; iron powder; water; and an antimicrobial agent, wherein the binding agent, carbon, silica gel, clay, hygroscopic salt and magnesium salt together form a "Composition A".

In a specific embodiment, the oxygen absorber tablet includes Composition A having 10 gm PVA, 30 gm carbon, 30 gm silica gel, 40 gm clay, 12 gm sodium chloride and 2 gm magnesium stearate; approximately 124 gm iron powder; water; and approximately 5 gm Sodium borohydrate (as 2% by weight of the total composition).

In the oxygen absorber tablet, the ratio of iron powder to "Composition A" is determined based on the target volume from where the oxygen is to be removed. Thus, in an oxygen absorber tablet, the ratio of iron powder to "Composition A" is 1 g of iron powder to 1 g of "Composition A" volumetric to 30 cc target air volume.

A process for preparation of oxygen absorber tablet includes the steps of (a) dissolving the binding agent in water till dissolution under heating followed by cooling at a predefined temperature; (b) preparing a separate mixture of carbon, silica gel, clay, hygroscopic salt & magnesium stearate; (c) adding a predefined quantity of antimicrobial agent to the above mixture of step (b); (d) adding a predefined quantity of the dissolved binding agent from step (a) to above mixture of step (c) to obtain a homogenous slurry; (e) adding a predefined quantity of water to make a consistent slurry; (f) drying the slurry at a predefined temperature to retain a predefined amount of moisture; (g) grinding the dried mixture to make a powder; (h) adding a predefined amount of iron powder to the dried mixture of the above step (g); and (i) pressing the above mixture obtained at a predefined constant pressure to obtain tablets of predefined dimension.

In this process, for preparing the oxygen absorber tablet for 30 cc target air volume, the binding agent is dissolved in water and heated at a temperature range of 85° C.-105° C. followed by cooling to room temperature in the range 30° C.-35° C.; the antimicrobial agent is added in a ratio of 1-3% of the total composition; the drying of the homogenous slurry is carried at a temperature of 110° C. to retain 10% moisture in the mixture; and the pressing of the mixture is carried out under a pressure of 15-25 KN to form two tablets of the size 9.00 mm (diameter)×5.00 mm (height).

The process for preparation of oxygen absorber tablet for 30 cc target air volume includes: (a) dissolving 10 gm of PVA in 100 ml water till dissolution under heating at a temperature of 90° C. followed by cooling to room temperature at 35° C.; (b) preparing a separate mixture by adding 30 gm of carbon, 30 gm of silica gel, 40 gm of clay, 12 gm of hygroscopic salt & 2 gm of magnesium stearate; (c) adding approximately 5 gm of sodium borohydrate to the above mixture of above step (b) in a ratio of 2% of the total composition; (d) adding the solution obtained by dissolving 10 gm of PVA from the above step (a) to the mixture obtained from above step (c) to obtain a homogenous slurry; (e) adding 100 ml of water to mixture of the above step (d) above to obtain a consistent slurry; (f) drying the consistent slurry obtained from the above step (e) at a temperature of 110° C. to retain 10% of the moisture in the mixture; (g) grinding the dried mixture of the above step (f) to make a powder; (h) adding 1 g of iron powder for 30 cc target air volume to 1 g of the the dried ground powder of the above step (g); and (i) pressing the mixture obtained from the above step (h) under a pressure of 15-25 KN to form two tablets of the size 9.00 mm (diameter)×5.00 mm (height).

In the process for preparing the oxygen absorber tablet, the synthesis of the oxygen absorber tablet is performed in controlled atmosphere of temperature of 25° C. and 25-50% relative humidity conditions.

BRIEF DESCRIPTION OF THE DRAWINGS

The present invention will be more fully understood from the detailed description and the accompanying drawings/ figures described herein below. These are only shown as illustrative of the means, therefore, not intended to limit the present invention.

DETAILED DESCRIPTION OF THE INVENTION

Figure 1:
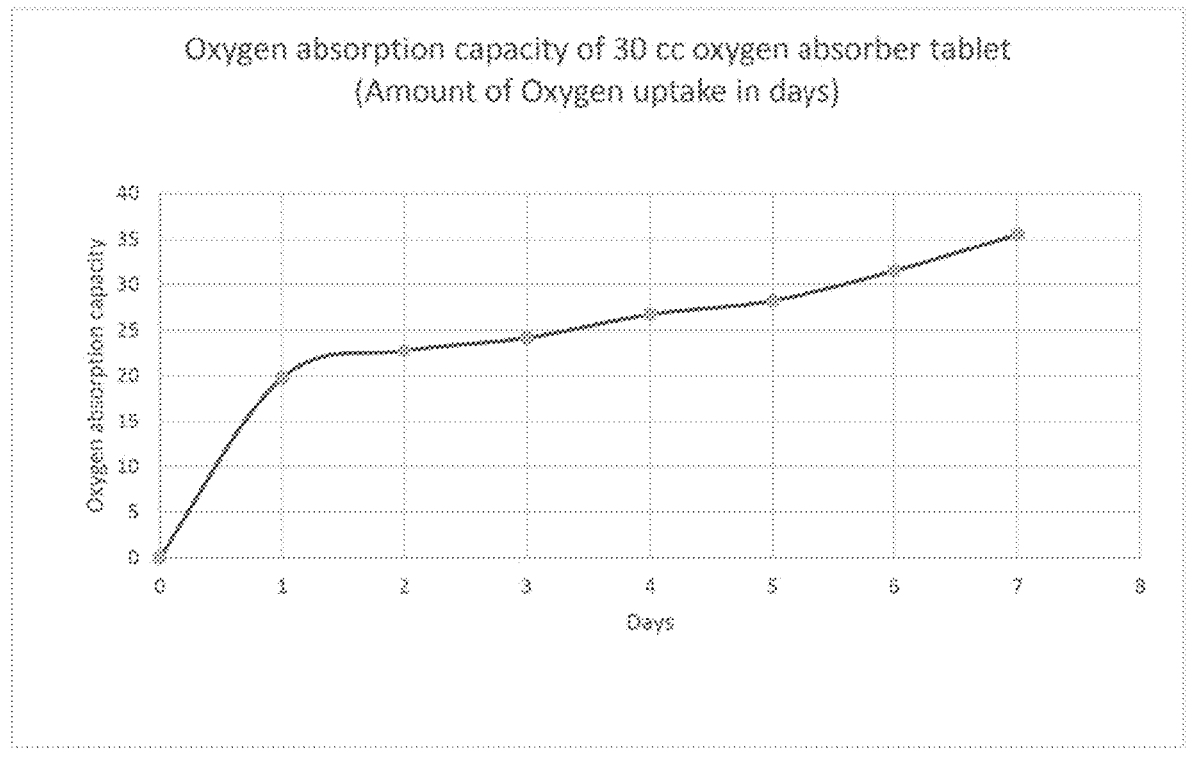
FIG. 1 shows the amount of oxygen uptake by the tablet in given number of days.

The present invention relates to an oxygen absorber composition in the form of an oxygen absorber tablet. The present invention also relates to a method of preparing the oxygen absorber tablet.

The foregoing objects of the present invention are accomplished and the problems and shortcomings associated with the prior art, techniques and approaches are overcome by the present invention as described below in the preferred embodiments.

All materials used herein were commercially purchased as described herein or prepared from commercially purchased materials as described herein.

Although specific terms are used in the following description for sake of clarity, these terms are intended to refer only to particular structure of the invention selected for illustration in the drawings and are not intended to define or limit the scope of the invention.

References in the specification to "preferred embodiment" means that a particular feature, structure, characteristic, or function described in detail thereby omitting known constructions and functions for clear description of the present invention.

In an aspect, the present invention provides an oxygen absorber composition compressed in the form of an oxygen absorber tablet.

In accordance with an embodiment, the oxygen absorber tablet of the present invention comprises:
(a) 5 gm to 15 gm binding agent;
(b) 25 gm to 35 gm carbon;
(c) 25 gm to 35 gm silica gel;

(d) 35 gm to 45 gm clay;
(e) 10 gm to 15 gm hygroscopic salt;
(f) 1 gm to 5 gm magnesium stearate;
(g) iron powder;
(h) water; and
(i) an antimicrobial agent.

In accordance with an alternative embodiment, the oxygen absorber tablet of the present invention does not contain an antimicrobial agent.

In accordance with a preferred embodiment, the oxygen absorber tablet of the present invention comprises:
1) "Composition A" having:
(a) 10 gm binding agent;
(b) 30 gm carbon;
(c) 30 gm silica gel;
(d) 40 gm clay;
(e) 12 gm hygroscopic salt;
(f) 2 gm magnesium stearate;
2) iron powder;
3) water; and
4) an antimicrobial agent,
such that the binding agent, carbon, silica gel, clay, hygroscopic salt and magnesium salt together form a "Composition A".

In this preferred embodiment, the binding agent is selected from poly vinyl alcohol (PVA), polyethylene glycol (PEG), polyvinyl pyrrolidone (PVP), polyacrylic acid (PAA), polyacrylamides, polyoxazoline, polyphosphates and polyphosphazenes; and the hygroscopic salt is selected from sodium chloride, zinc chloride, calcium chloride, magnesium chloride; including a few base components like potassium hydroxide and sodium hydroxide.

In this preferred embodiment, the oxygen absorber composition includes an antimicrobial agent. The antimicrobial agent is added in a ratio of 1-3% of the total composition. The antimicrobial agent is selected from sodium borohydrate, and the like.

In accordance with the present invention, the oxygen absorber composition includes iron powder that acts as an oxygen absorbing agent. The iron powder mimics the natural rusting process within the pouch, canister or blister packing in a controlled approach. The silica gel and clay in the "Composition A" of the oxygen absorber composition adsorb water in the form of moisture. The carbon in the "Composition A" of the oxygen absorber composition retains the moisture adsorbed through silica gel and clay.

In the preferred embodiment, the ratio of iron powder to "Composition A" is determined depending on the target air volume from where the oxygen is to be removed. Thus, the quantity of iron powder increases, if the target air volume increases. Hence a different ratio of iron powder to "Composition A" is maintained with respect to the target air volume of the pouch, bottle or canister. Thus, this ratio is 1 g of "Composition A" to 1 g of iron powder volumetric to 30 cc target air volume.

Now a preferred process for the preparation of the oxygen absorber tablet in accordance with the present invention is disclosed. The process for preparing the oxygen absorber tablet for 30 cc target air volume includes the steps of:
(a) dissolving the binding agent in water till dissolution under heating followed by cooling at a predefined temperature;
(b) preparing a separate mixture of carbon, silica gel, clay, hygroscopic salt & magnesium stearate;
(c) adding a predefined quantity of antimicrobial agent to the above mixture of step (b);

5

(d) adding a predefined quantity of the dissolved binding agent from step (a) to above mixture of step (c) to obtain a homogenous slurry;

(e) adding a predefined quantity of water to make a consistent slurry;

(f) drying the slurry at a predefined temperature to retain a predefined amount of moisture;

(g) grinding the dried mixture to make a powder;

(h) adding a predefined volumetric amount of iron powder to the dried ground powder of the above step (g); and (i) pressing the above mixture obtained at a predefined constant pressure to obtain tablets of predefined dimension.

The detailed steps of the above-mentioned process for preparing the oxygen absorber tablet for 30 cc target air volume are described herein:

In the step (a), 10 gm of binding agent is dissolved in 100 ml water by heating to a temperature range of 85° C.-105° C. followed by cooling to room temperature in the range 30° C.-35° C.

In the step (b), the separate mixture is prepared by adding 30 gm of carbon, 30 gm of silica gel, 40 gm of clay, 12 gm of hygroscopic salt & 2 gm of magnesium stearate.

In the step (c), the antimicrobial agent sodium borohydrate is added in a ratio of 1-3% of the total composition.

In the step (d), the solution of the dissolved binding agent obtained from step (a) is added to a mixture of step (c) to obtain a homogenous slurry.

In the step (e), 100 ml of water is added to mixture of step (d) to obtain a consistent slurry;

In the step (f), the homogenous slurry obtained from the above step (e) is dried at 110° C. such that 10% of the moisture is retained in the mixture.

In the step (h), 1 g of iron powder is added for 30 cc target air volume to the 1 g of dried ground mixture of step (g).

In step (i), the mixture is pressed under a pressure of 15-25 KN to form two tablets of the size 9.00 mm (diameter)×5.00 mm (height).

In accordance with this embodiment, by increasing the amount of iron powder and dimensions of tablets, the required target oxygen absorption capacity is obtained.

In this embodiment, the process of synthesis of the oxygen absorber tablet is performed in a controlled atmosphere of 25° C. and 25-50% relative humidity conditions to avoid the premature initiation of target oxidation of iron powder.

In an alternative embodiment, the process for preparing the oxygen absorber tablet does not include the step of addition of a predefined quantity of an antimicrobial agent.

In accordance with the present invention, the drying of the slurry in the process of synthesis of the oxygen absorber tablet is carried out in a hot air oven at 70° C.-110° C. for varying time, depending on the quantity of the slurry. In order to obtain the tablet form, the moisture is maintained at 12%-20% in the dried slurry. The water activity of the dried slurry is maintained between water activity (Aw)=0.4 to 0.9, and further preferably between Aw=0.7 to 0.9.

In accordance with the present invention, the ratio of iron powder to "Composition A" varies proportionally for the tablet preparation depending on the target air volume. Accordingly, the tablets are prepared corresponding to 30 cc, 100 cc, 250 cc and 500 cc of target air volume. Alternatively, multiple tablets of 30 cc target air volume are added to the pouch, canister, blister packaging or bottle specific to the target air volume, as per requirement.

In another embodiment, the oxygen absorber composition is deposited on perforated sheets to provide laminated oxygen absorber sheets. The oxygen absorber tablet and oxygen absorber sheets are placed into perforated pouches, canisters, and blister packages as per the requirement.

EXAMPLES

Only a few examples and implementations are disclosed. Variations, modifications, and enhancements to the described examples and implementations and other implementations can be made based on what is disclosed.

Examples are set forth herein below and are illustrative of different amounts and types of reactants and reaction conditions that can be utilized in practicing the disclosure. It will be apparent, however, that the disclosure can be practiced with other amounts and types of reactants and reaction conditions than those used in the examples, and the resulting devices various different properties and uses in accordance with the disclosure above and as pointed out hereinafter.

Example 1: Oxygen Absorber Tablet with Oxygen Absorber Composition in Unit Quantities for 30 cc Target Air Volume The oxygen absorber tablet for 30 cc target air volume includes:

1) "Composition A" having:
   (a) 10 gm PVA;
   (b) 30 gm carbon;
   (c) 30 gm silica gel;
   (d) 40 gm clay;
   (e) 12 gm sodium chloride;
   (f) 2 gm magnesium stearate;
2) approximately 124 gm iron powder,
3) water; and
4) approximately 5 gm Sodium borohydrate (as 2% by weight of the total composition)

The weight % of ingredients in "Composition A" are given as follows:

TABLE 1

| Weight % of ingredients in "Composition A" | |
| --- | --- |
| Composition A | weight % |
| Carbon | 24.19 |
| Silica gel | 24.19 |
| Clay | 32.26 |
| Sodium chloride | 9.68 |
| PVA | 8.06 |
| Magnesium stearate | 1.61 |

Further the specification of the tablet is as follows:

TABLE 2

| Specification of the tablet SPECIFICATION | |
| --- | --- |
| 1 tablet | 0.5 g of iron powder and 0.5 g of "Composition A" |
| Weight of the tablet | 2.45 gm |
| Dimensions of the tablet | Diameter: 9.00 mm & Height: 6.00 mm |

Example 2: Process of Preparing Oxygen Absorber Tablet for 30 cc Target Air Volume The process for preparing the oxygen absorber tablet for 30 cc target air volume is described below:

(a) 10 gm of PVA is dissolved in 100 ml water till dissolution under heating at 90° C. followed by cooling to room temperature at 35° C.

(b) A separate mixture of 30 gm of carbon, 30 gm of silica gel, 40 gm of clay, 12 gm of sodium chloride & 2 gm of magnesium stearate is prepared.

(c) Approximately 5 gm of Sodium borohydrate is added to the mixture of above step (b) in a ratio of 2% of the total composition.

(d) The solution obtained by dissolving 10 gm of PVA from the above step (a) is added to the mixture obtained from the above step (c) to obtain a homogenous slurry.

(e) 100 ml of water is added to mixture of the above step (d) to obtain a consistent slurry.

(f) The consistent slurry of step (e) is dried at 110° C. such that 10% of the moisture is retained in the mixture.

(g) The dried mixture from step (f) is ground to make a powder.

(h) 1 g of iron powder for 30 cc target air volume is added to 1 g of dried ground powder of the step (g) having water activity measured as Aw=0.8.

(i) The mixture is pressed under a pressure of 15-25 KN to form two tablets of the size 9.00 mm (diameter)× 5.00 mm (height).

Example 3: Demonstration of the Oxygen Absorption Capacity of the Oxygen Absrber Tablet

Example 3.1: Method for Analysis of the Oxygen Absorption Capacity Test for the Oxygen Absorber Tablet in Pouch, Canister, or Blister Packing The equipment required for analysis of oxygen absorption capacity includes an oxygen analyzer (Mocon, Dansensor; Checkpoint 3), a sample bottle (gas barrier PET bottles minimum 5 times bigger than the claim of oxygen absorber capacity) in ml and septa (silicone rubber pad).

The oxygen analyzer device withdraws air from open environment or empty sample bottle through the sampling probe and displays the oxygen content in percentage. The required range is 19% to 21%.

After satisfactory result of oxygen percentage in the air or in empty sample bottle, 1 packing (pouch, canister or blister) of oxygen absorber is put into a one gas barrier PET bottle as per defined validated method (minimum 5 times bigger than the claim of oxygen absorber capacity). Five sets are prepared in the same way for testing purpose. A Septa is stuck on to the outer surface of the sample bottle for inserting the needle of the Oxygen analyzer to prevent air passage from the bottle. The sample bottle is properly sealed to ensure that no air is passing through the sample bottle. As specified, a PET bottle minimum 5 times bigger than the claim of oxygen absorber capacity is required for oxygen absorption. [Thus, for Oxygen absorber TC-30 (True capacity of 30 ml), 150 ml PET bottle is required].

The oxygen analyzer is used for sample bottle in the procedure as follows: The needle of oxygen analyzer is inserted into the bottle where septa are placed. The concentration of oxygen absorber in percentage is recorded. The needle is removed out from the sample bottle. The sample bottle is discarded once analyzed. The oxygen concentration in the sample bottle containing oxygen absorber is recorded after 24 hours of time interval.

Example 3.2: Formula for Calculation of Oxygen Absorption Capacity Test for Oxygen Absorber Tablet in Canister Formula for percentage (%) converted into ml:

Formula for $O_2$ in bottle:

$$\frac{\text{bottle (ml)} \times O_2 \text{ \% in atmosphere or sample bottle}}{100}$$

For example:
Oxygen absorber TC-30 absorber required 150 ml (Minimum size) PET bottle: i.e., when $O_2$% in atmosphere is (19 to 21) %:

$$\frac{\text{bottle (150 ml)} \times (19 \text{ to } 21)}{100} = X \text{ ml}$$

$$\frac{\text{bottle (150 ml)} \times 0.2}{100} = 0.2 \ (Y) \text{ ml}$$

$O_2$ concentration after 120 hrs. (5 days) in container remain 0.2%:
Minimum Oxygen absorption capacity at 25+2° C. for 5 days (Z ml)=X−Y i.e., =Z ml $O_2$ absorb by oxygen absorber from sample bottle.

Example 3.3: Oxygen Absorption Capacity (ml) for Oxygen Absorber Tablet in any Packing The oxygen absorption capacity (ml) for 30 cc oxygen absorber tablet with respect to the no. of days is as given in the table below.

TABLE 3

| Oxygen absorption capacity of oxygen scavenger tablets (ml) | |
| --- | --- |
| Time (days) | Oxygen absorption capacity (ml) |
| 1 | 19.8 |
| 2 | 22.75 |
| 3 | 24.2 |
| 4 | 26.75 |
| 5 | 28.25 |
| 6 | 31.5 |
| 7 | 35.5 |

The oxygen absorption capacity of 30 cc oxygen absorber tablet with respect to no. of days in unit quantities is shown in FIG. 1. The study shows the amount of oxygen uptake by the tablet in given no. of days.

Figure 2:
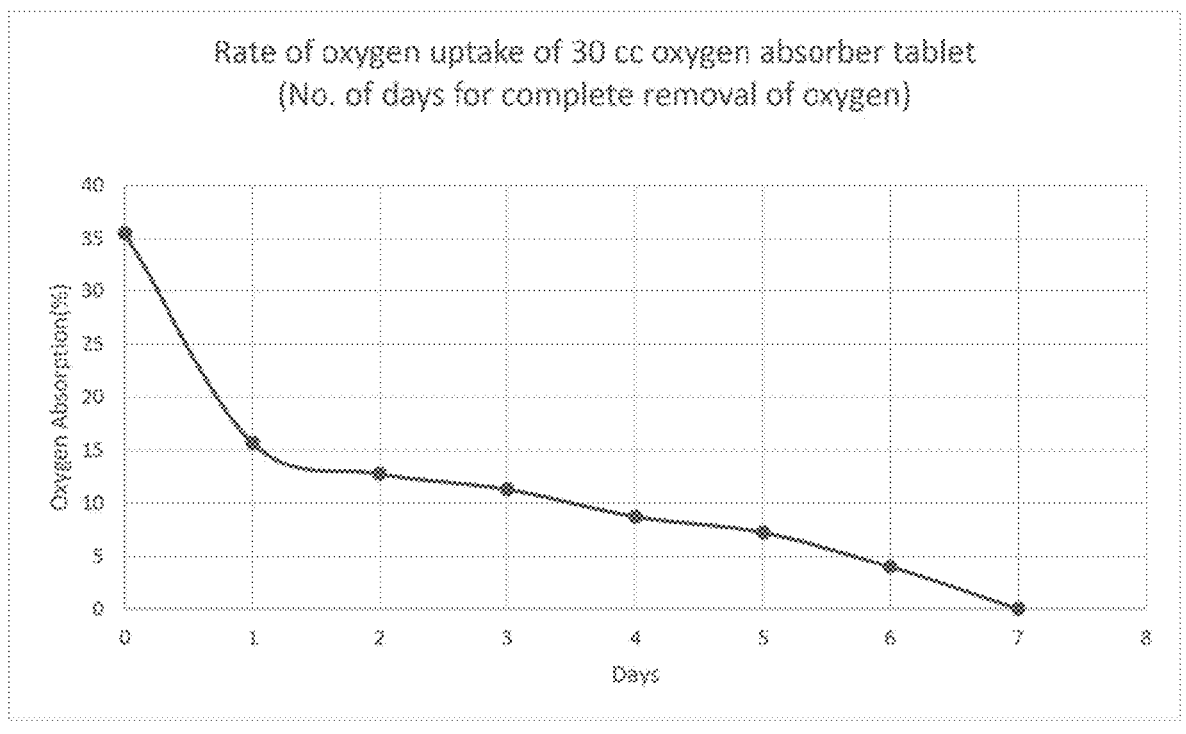
FIG. 2 shows the complete removal of oxygen from a canister in given no. of days.

The rate of oxygen uptake of the 30 cc oxygen absorber tablet with respect to no. of days is shown in FIG. 2. The study shows the complete removal of the oxygen by the packing in given no. of days.

Example 4: Demonstration of Moisture Absorption Capacity of Oxygen Scavenger Tablets

Example 4.1: Method for Analysis of Moisture Absorption Properties of Oxygen Absorber Tablet The equipment required for analyzing the moisture absorption properties of the oxygen absorber tablet includes a humidity chamber capable of maintaining a controlled temperature at 25° C.±2° C.& humidity of 80%±5% RH; and a weighing balance.

The tablet is removed from sample pouch [i.e., OBTL (Oxygen barrier transmission laminate) bag] and its weight was measured and recorded as M1. The sample is kept in the humidity chamber under the conditions of controlled temperature at 25° C.±2° C. & humidity of 80%±5% RH. The tablet is taken out from the humidity chamber after a time interval and the weight reading (M2) is noted down. This process is continued till a constant mass observed.

Example 4.2: Formula for Calculation of Moisture Absorption Properties of Oxygen Absorber Tablet The below formula is used to calculate the adsorption capacity as % weight gained over the initial sample weight. The material is kept in the humidity chamber for given temperature and humidity conditions till the acceptance criteria result are achieved.

$$\text{Moisture adsorption Capacity (MAC) } \% = [(M2 - M1)/M1] * 100$$

where, $$M1 = \text{Weight of tablet before adsorption}$$

$$M2 = \text{Weight of tablet after adsorption}$$

Example 4.3: Moisture Absorption Capacity of the Oxygen Absorber Tablet

The moisture absorption capacity for the 30 cc oxygen absorber with respect to the no. of days is as given in the table below.

TABLE 4

Moisture absorption capacity of 30 cc oxygen absorber tablets (g/g)

| Time (days) | RH (%) | Moisture absorbed (g/g) |
|---|---|---|
| 1 | 80 | 0.08 |
| 2 | 80 | 0.12 |
| 3 | 80 | 0.15 |
| 4 | 80 | 0.16 |

Figure 3:
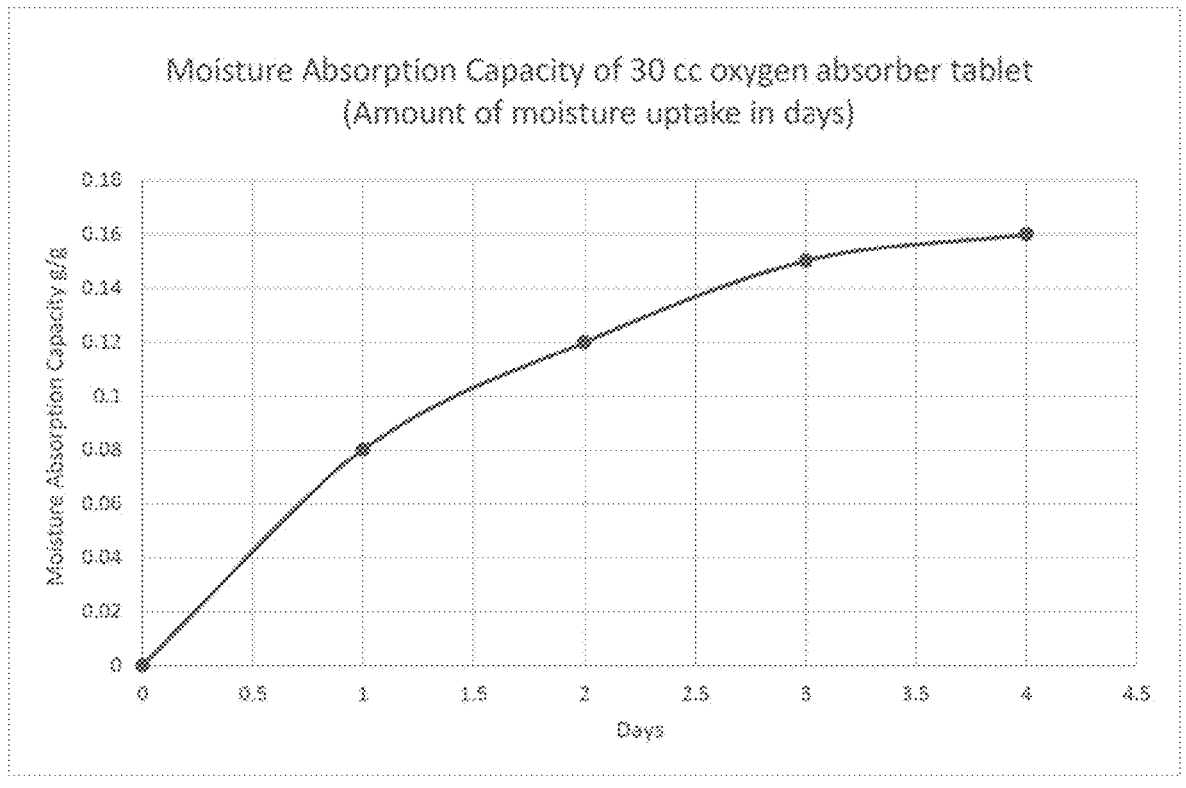
FIG. 3 shows amount of moisture absorbed by a tablet in given number of days.

The moisture absorption of the 30 cc oxygen scavenger tablet with respect to no. of days in unit quantities is shown in FIG. 3. The study shows the amount of moisture absorption by the tablet in given no. of days.

Figure 4:
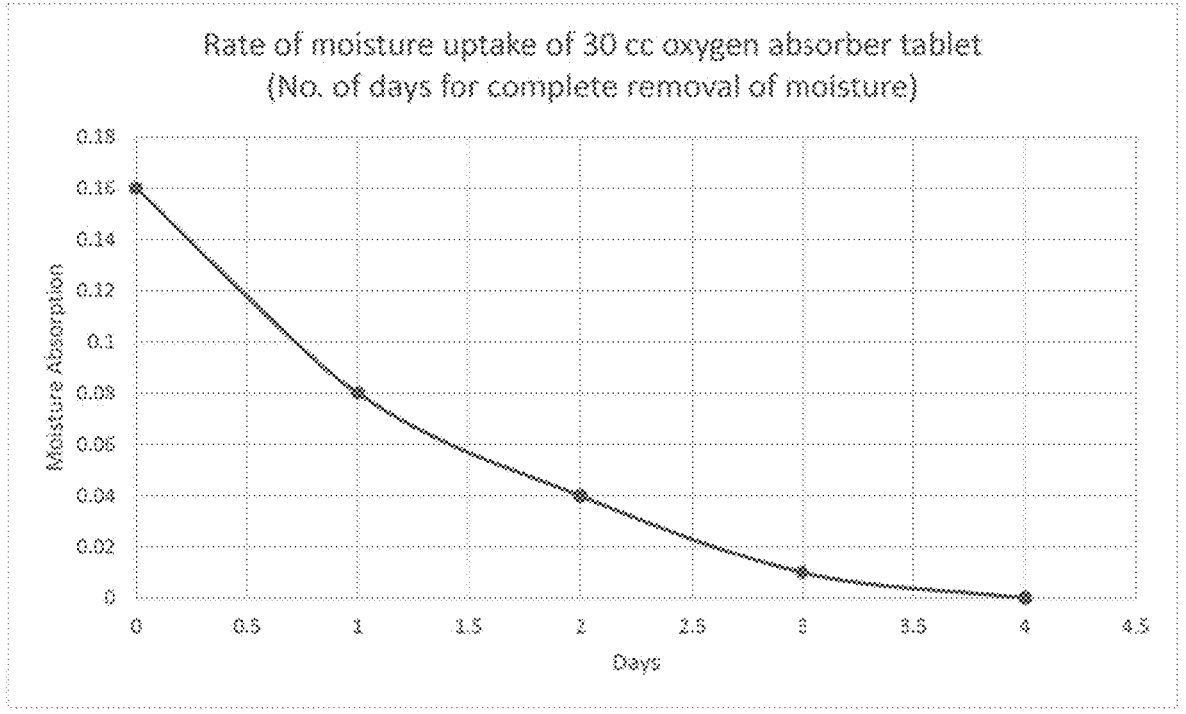
FIG. 4 shows the complete removal of the moisture from the canister in given number of days.

The rate of moisture uptake of the 30 cc oxygen absorber tablet with respect to no. of days is shown in FIG. 4. The study shows the complete removal of the moisture from the canister in given no. of days.

These and other embodiments will be apparent to those of skill in the art and others in view of the following detailed description of some embodiments. It should be understood, however, that this summary, and the detailed description illustrate only some examples of various embodiments and are not intended to be limiting to the invention as claimed.

The oxygen absorber composition has an enhanced oxygen absorption amount per unit volume. Addition of iron powder in specific ratio to the moisture absorbing and odour absorbing desiccants leads to the simultaneous removal of oxygen, moisture, and odour. Thus, the oxygen absorber tablet has an added advantage of absorbing moisture and odour from the available target air volume. Specifically added carbon helps in minimizing the hydrogen evolved during the oxidation process. The oxygen absorber tablet helps diminishing the hydrogen and carbon dioxide gas generated during oxidation. The antimicrobial agents are introduced as and when required by the user. The oxygen absorber tablet provides compactness and user friendliness, compared to powdered oxygen absorbers. The oxygen absorber tablet solves the problem associated with powdered oxygen absorbers related mainly to the spillage from the pouches and canisters. The oxygen absorber tablets are prepared with varying capacities to address oxygen absorption from 20 to 500 cc target air volume. Single or multiple oxygen absorber tablets are used as per the target air volume of the bottle/container. The oxygen absorber tablets are moulded into sizing 8 to 16 mm diameter and 2 to 25 mm height. The oxygen absorber tablets are used to increase the shelf life of pharmaceutical, food and nutraceutical products.

The embodiments were chosen and described in order to best explain the principles of the present invention and its practical application, to thereby enable others, skilled in the art to best utilize the present invention and various embodiments with various modifications as are suited to the particular use contemplated.

It is understood that various omission and substitutions of equivalents are contemplated as circumstance may suggest or render expedient, but such are intended to cover the application or implementation without departing from the spirit or scope of the present invention.

The invention claimed is:

1. An oxygen absorber tablet formed by compressing an oxygen absorber composition comprising:
   a) 5 gm to 15 gm binding agent;
   b) 25 gm to 35 gm carbon;
   c) 25 gm to 35 gm silica gel;
   d) 35 gm to 45 gm clay;
   e) 10 gm to 15 gm hygroscopic salt;
   f) 1 gm to 5 gm magnesium stearate;
   g) iron powder;
   h) water; and
   i) an antimicrobial agent.

2. The oxygen absorber tablet as claimed in claim 1, including
   a) 10 gm of binding agent;
   b) 30 gm of carbon;
   c) 30 gm of silica gel;
   d) 40 gm of clay;
   e) 12 gm of hygroscopic salt;
   f) 2 gm of magnesium stearate;
   g) iron powder;
   h) water; and
   i) an antimicrobial agent
wherein the binding agent, carbon, silica gel, clay, hygroscopic salt and magnesium salt together form a "Composition A".

3. The oxygen absorber tablet as claimed in claim 2, including
   a) Composition A having 10 gm PVA for the binding agent, 30 gm carbon, 30 gm silica gel, 40 gm clay, 12 gm sodium chloride for the hygroscopic salt and 2 gm magnesium stearate;
   b) 124 gm iron powder;
   c) water, and
   d) 5 gm Sodium borohydrate for the antimicrobial agent.

4. The oxygen absorber tablet as claimed in claim 3, wherein the ratio of iron powder to "Composition A" is determined based on the target volume from where the oxygen is to be removed.

5. The oxygen absorber tablet as claimed in claim 4, wherein the ratio of iron powder to "Composition A" is 1 g of iron powder to 1 g of "Composition A" for 30 cc target air volume.

6. A process for preparation of oxygen absorber tablet as claimed in claim 1 including the steps of:

a) dissolving the binding agent in water till dissolution under heating followed by cooling;

b) preparing a separate mixture of carbon, silica gel, clay, hygroscopic salt & magnesium stearate;

c) adding antimicrobial agent to the mixture of step (b);

d) adding the dissolved binding agent from step (a) to mixture of step (c) to obtain a homogenous slurry;

e) adding water to make a consistent slurry;

f) drying the slurry to retain 10% moisture;

g) grinding the dried mixture to make a powder;

h) adding iron powder to the dried mixture of the step (g); and i) pressing the mixture obtained at a constant pressure to obtain tablets.

7. The process as claimed in claim 6 for preparing the oxygen absorber tablet for 30 cc target air volume wherein:

a) the binding agent is dissolved in water and heated at a temperature range of 85° C.-105° C. followed by cooling to room temperature in the range 30° C.-35° C.;

b) the antimicrobial agent is added in a ratio of 1-3% of the total composition;

c) the drying of the homogenous slurry is carried at a temperature of 110° C. to retain 10% moisture in the mixture; and d) the pressing of the mixture is carried out under a pressure of 15-25 KN to form two tablets of the size 9.00 mm (diameter)×5.00 mm (height).

8. The process as claimed in claim 6 for preparing the oxygen absorber tablet for 30 cc target air volume including the steps of:

a) dissolving 10 gm of PVA for the binding agent in 100 ml water till dissolution under heating at a temperature of 90° C. followed by cooling to room temperature at 35° C.;

b) preparing a separate mixture by adding 30 gm of carbon, 30 gm of silica gel, 40 gm of clay, 12 gm of hygroscopic salt & 2 gm of magnesium stearate;

c) adding 5 gm of sodium borohydrate for the antimicrobial agent to the above mixture of above step (b) in a ratio of 2% of the total composition;

d) adding the solution obtained by dissolving 10 gm of PVA from the above step (a) to the mixture obtained from above step (c) to obtain a homogenous slurry;

e) adding 100 ml of water to mixture of the above step (d) above to obtain a consistent slurry;

f) drying the consistent slurry obtained from the above step (e) at a temperature of 110° C. to retain 10% of the moisture in the mixture;

g) grinding the dried mixture of the above step (f) to make a powder;

h) adding 1 g of iron powder for 30 cc target air volume to 1 g of the the dried ground powder of the above step (g); and i) pressing the mixture obtained from the above step (h) under a pressure of 15-25 KN to form two tablets of the size 9.00 mm (diameter)×5.00 mm (height).

9. The process as claimed in claim 6 for preparing the oxygen absorber tablet, wherein the process of synthesis of the oxygen absorber tablet is performed in controlled atmosphere of temperature of 25° C. and 25-50% relative humidity conditions.

\* \* \* \* \*